United States Patent
Kuenster et al.

[11] Patent Number: 6,157,291
[45] Date of Patent: Dec. 5, 2000

[54] HEAD MOUNTED DISPLAY SYSTEM

[75] Inventors: Gordon B. Kuenster, Medina; John W. Pace, Bothell; Steven J. Shankle, Redmond; Kevin W. Shimasaki, Bothell; Fredrick W. Rivera, Bothell; Joel W. Robinson, Bothell; Wendie L. Siverts, Everett, all of Wash.

[73] Assignee: Virtual Vision, Inc., Redmond, Wash.

[21] Appl. No.: 08/320,782

[22] Filed: Oct. 11, 1994

Related U.S. Application Data

[63] Continuation of application No. 07/985,876, Dec. 4, 1992, abandoned.

[51] Int. Cl.$^7$ .................................................. G09G 5/00
[52] U.S. Cl. .............................................. 340/8; 359/630
[58] Field of Search .............................. 345/8, 7; 351/8, 351/158, 50; 353/122; 359/630, 13, 618; 340/980

[56] References Cited

U.S. PATENT DOCUMENTS

| | | | |
|---|---|---|---|
| 4,280,758 | 7/1981 | Flader et al. | 351/88 |
| 4,547,048 | 10/1985 | Negishi | 351/88 |
| 4,673,263 | 6/1987 | Onufryk | 351/50 |
| 4,810,080 | 3/1989 | Grendol et al. | 351/158 |
| 4,867,551 | 9/1989 | Perera | 351/158 |
| 4,902,120 | 2/1990 | Weyer | 351/41 |
| 4,945,573 | 8/1990 | Landis | 351/158 |
| 5,106,179 | 4/1992 | Kamaya et al. | 351/158 |
| 5,162,828 | 11/1992 | Furness et al. | 353/122 |

*Primary Examiner*—Dennis-Doon Chow
*Attorney, Agent, or Firm*—McAndrews, Held & Malloy, Ltd.

[57] ABSTRACT

A head mounted display system is shown that is modular such that various components of the system are removably mounted and/or adjustably mounted on a frame that is supported on a user's head. The head mounted display system can thus accommodate different users and components of different configurations. In particular, the display system includes a mirror through which a displayed image is viewed, the position of the mirror being adjustable and the mirror being removable from the frame of the display system. The display system further includes a nose piece that is adjustably mounted on the frame so as to allow the distance between the frame member supporting the display and a nose bridge to be varied. The nose piece is further completely removable from the frame of the display system so as to allow the display system to accommodate a user wearing conventional glasses. The display system also includes removable earphones and removable earphone retainers disposed on the temples of the display system. The hinges connecting the temples to the frame of the display system are removable and further include wire retaining members so as to maintain the earphone wire, if present, adjacent to the temple of the display system.

50 Claims, 5 Drawing Sheets

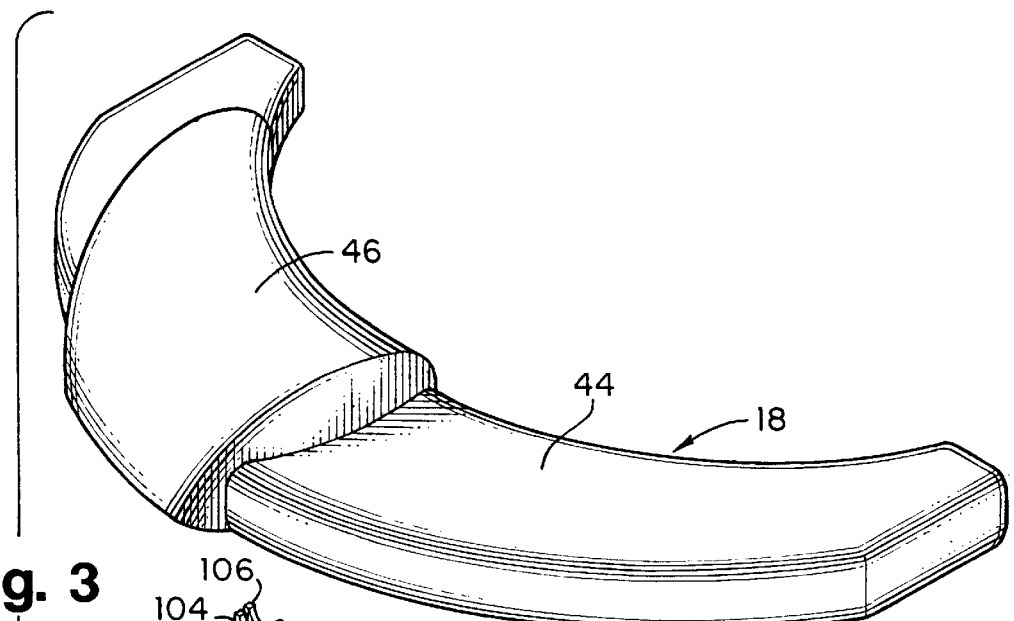
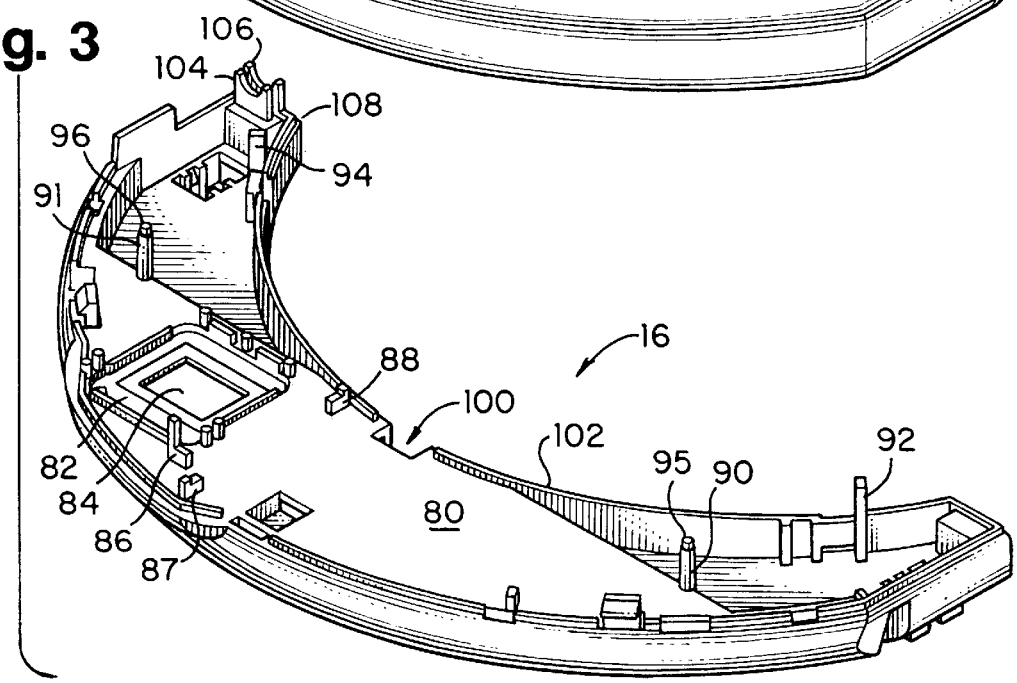
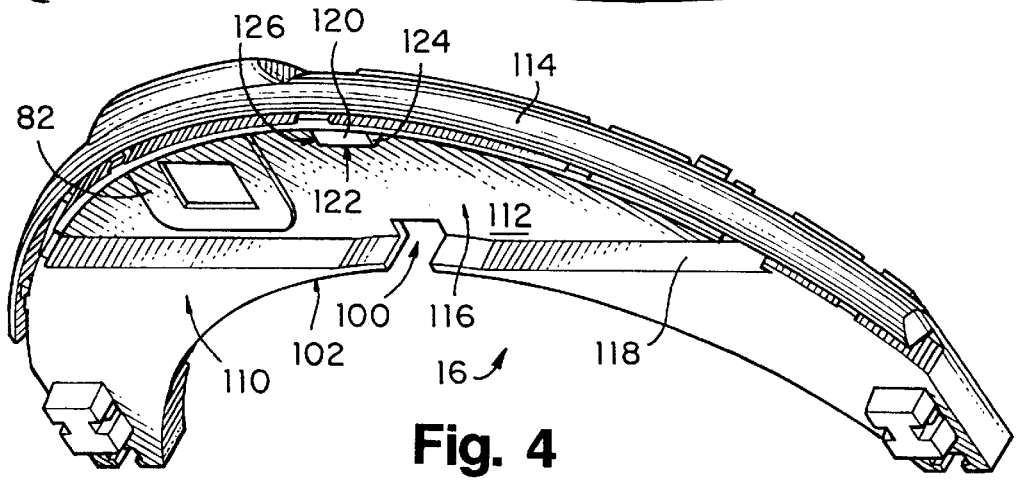

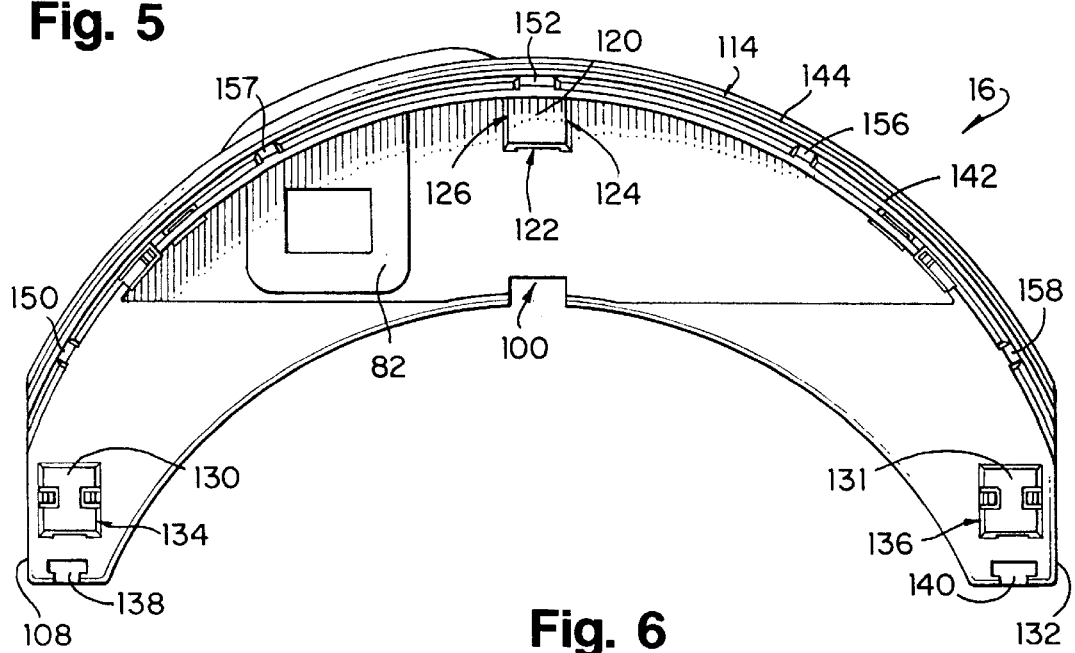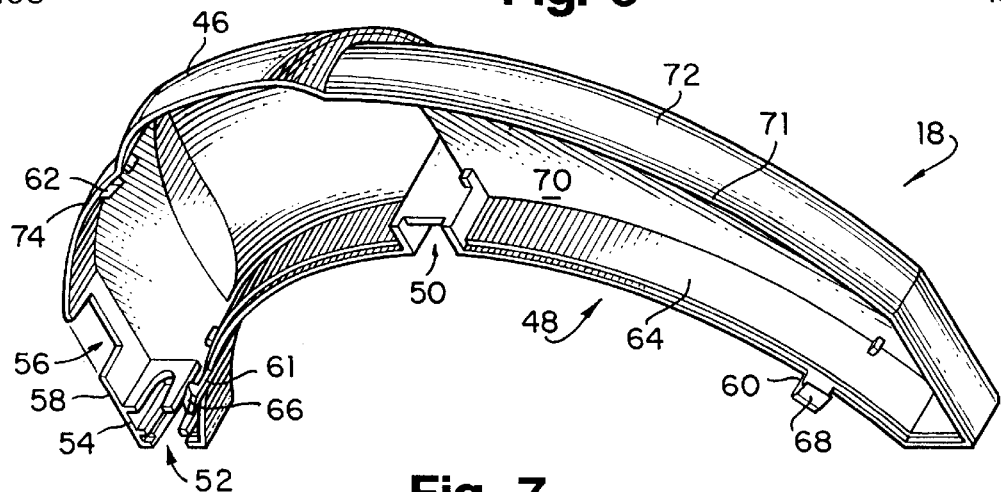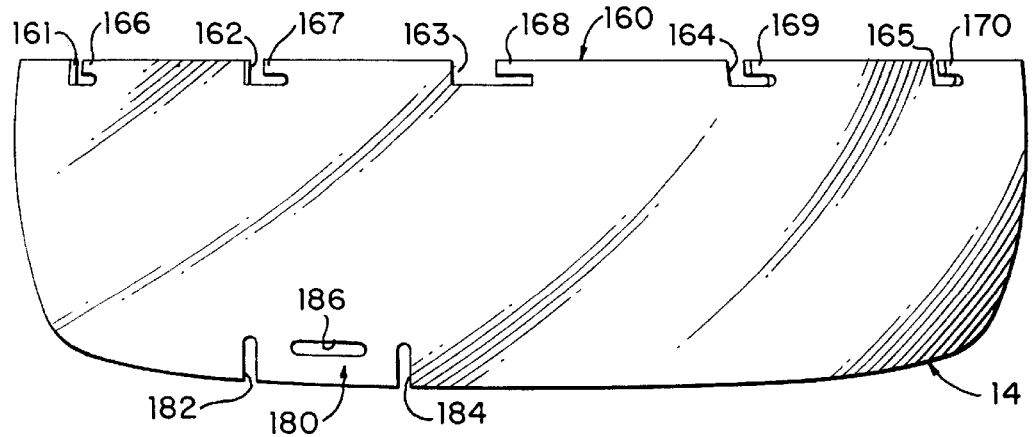

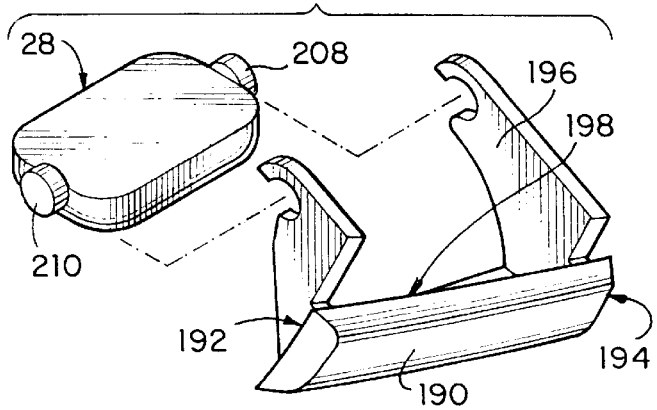
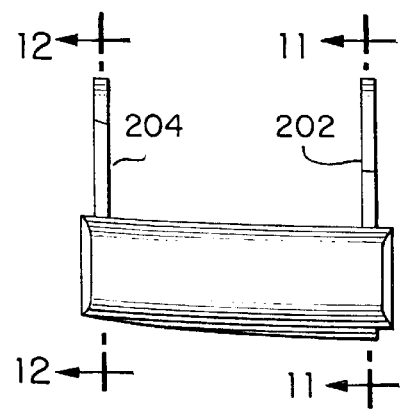
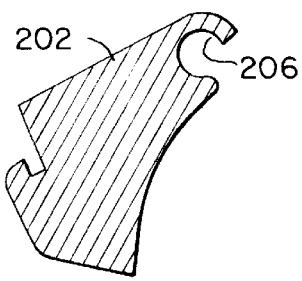
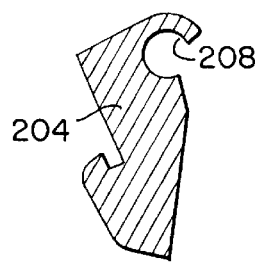
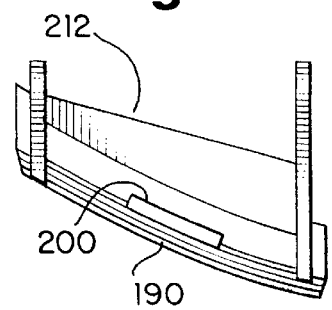
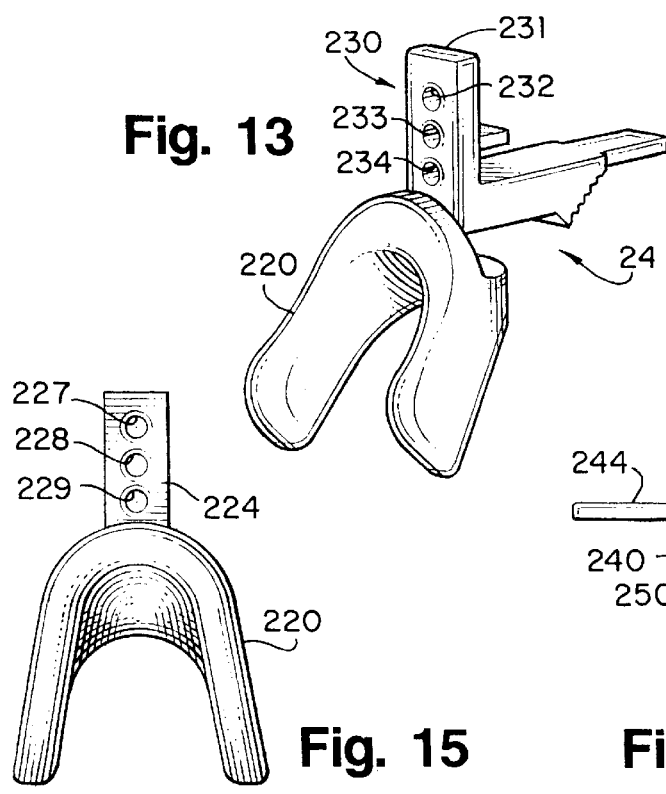
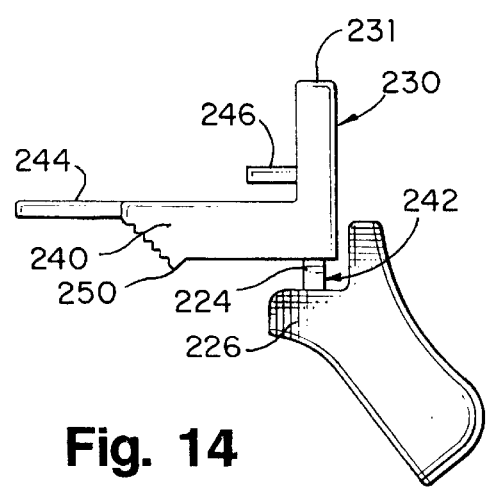

HEAD MOUNTED DISPLAY SYSTEM

This is a continuation of application Ser. No. 07/985,876 filed Dec. 4, 1992 abandoned.

TECHNICAL FIELD

The present invention is directed to a head mounted display system and more particularly to a modular head mounted display system wherein various components thereof are removably mounted and/or adjustably mounted on a frame that is supported on a user's head so that the head mounted display system can accommodate different users and components of diverse configuration.

BACKGROUND OF THE INVENTION

Known head mounted or head-up display systems are typically used for military applications. For example, a head-up display may be mounted on a helmet worn by a pilot in order to project an image in the pilot's direct line of sight and at infinity to aid the pilot in carrying out a military operation. Such systems typically include a cathode ray tube, CRT, that is mounted on the pilot's helmet where the CRT receives video information via heavy cables that are coupled to video display generating equipment that is fixedly mounted on the aircraft.

Because these systems are cumbersome, bulky and heavy, they are not suitable for consumer type applications. Further, known head mounted display systems typically utilize components such as a display and optics that are mounted in a fixed relation to one another. Such systems typically can only accommodate a small range of head sizes. Manufacturing head mounted display systems with various fixed configurations so as to accommodate different head sizes is extremely expensive; however, if the system cannot accommodate a wide range of head sizes, the system is not suitable for consumer use since the head size among consumers varies greatly.

SUMMARY OF THE INVENTION

In accordance with the present invention, the disadvantages of prior head-up display systems have been overcome. The head mounted display system of the present invention is modular such that various components of the system are removably mounted and/or adjustably mounted on a frame that is supported on a user's head so that the head mounted display system can accommodate different users and components of different configurations.

More particularly, the head mounted display system of the present invention includes a display for displaying information and optics that collimate light to project an enlarged image of the displayed information at a distance from the user to allow the displayed information to be viewed by a user. In one embodiment, the optics may include a reflector, for example, that is viewed by the user to see the projected image. A frame supports the display and the reflector on a user's head.

In one embodiment, the head mounted display system further includes an optical path adjusting system to allow the optical path defined by the relative position of the reflector, the display and an eye of the user to be adjusted relative to at least two axes. The optical path adjusting system may, for example, include an adjustable mounting for the reflector so that the position of the reflector can be altered with respect to a first axis. The optical path adjusting system may also include, for example, a nose piece that is adjustably mounted relative to the frame to allow the frame on which the display and reflector are mounted to be moved relative to a generally vertical axis and, more particularly to be raised and lowered relative to the user's nose. This feature allows the distance between the display and the user's eye and/or the reflector and the user's eye to be varied. Because the optical path is adjustable relative to two axes, the head mounted display system of the present invention can accommodate users having various head sizes and various head configurations.

In accordance with another feature of the present invention, the nose piece of the frame is made removable. The frame is formed with a frame member on which the display is mounted. This frame member includes a longitudinally extending recess disposed between an inner edge of the frame member and the display. The recess is such as to be able to receive an upper edge of a frame of a pair of conventional glasses when the nose piece is removed. When the display system is worn with conventional glasses, the frame rests on the glasses, the nose piece of the glasses being in the same position that the nose piece of the head mounted display system would be in if not removed. Thus, a single head mounted display system in accordance with the present invention can accommodate a user with or without glasses.

In accordance with another feature of the present invention, the collimating means or reflector is made removable so that reflectors or optics with various focal lengths may be utilized with the same head mounted display system for various applications. For example, when the head mounted display system is worn by a passenger of an aircraft, a reflector with a short focal length might be desirable so that an image of a desired size is projected at a shorter distance from the user than would be desirable if the user were in a different environment with a longer field of view, the field of view of an airplane passenger being limited by the seat in front of the passenger.

In one embodiment of the present invention the frame includes a transparency on which the reflector is removably mounted. The transparency is removably mounted in a transparency holder of the frame to allow transparencies having various light transmissive qualities to be utilized in the system. More particularly, for indoor use, it might be desirable to have a transparency that is clear; whereas for outdoor use, it might be desirable to have a lens transparency that is tinted such as the lens of a conventional pair of sunglasses. Because the transparency is removably mounted on the frame and the reflector is removably mounted on the transparency, the transparency may be changed for various applications without the need to replace the frame or the reflector.

In a further embodiment of the present invention, the head mounted display system includes at least one earphone or speaker to project audio information to the user so that the video information depicted on the display can be accompanied by audio. In accordance with one feature of the present invention, the frame of the head mounted display system includes an earphone retaining member that is mounted on one of the temples of the frame so as to retain the earphone when the earphone is not in use. This earphone retaining member as well as the earphone itself may be removable from the frame so that different types of earphones may be utilized according to the preference of the user.

In still a further feature of the present invention, both temples of the frame include a hinge wherein at least one of the hinges includes a hooking means for retaining an earphone wire adjacent the temple. The hooking means is such as to allow the wire to be removed therefrom when the earphone is changed. Further, the hinge itself is removably mounted to the frame and the other portion of the temple so as to allow hinges of various flexibility to be employed to comfortably maintain the temple on users' heads of various sizes.

Because of the modular configuration of the head mounted display system of the present invention, the system can accommodate different users so that it is suitable for a wide cross section of the consumer population. Further, because the display system can accommodate components of different configurations, the system of the present invention may be updated to fit the desires or particular applications of a given user.

These and other objects, advantages and novel features of the present invention as well as details of an illustrated embodiment thereof, will be more fully understood from the following description and the drawing.

BRIEF DESCRIPTION OF THE DRAWING

FIG. 3 is an exploded perspective view illustrating the frame cover and lens holder shown in FIG. 1;

FIG. 4 is a bottom perspective view of the lens holder depicted in FIG. 3;

FIG. 5 is a bottom view of the lens holder depicted in FIG. 3;

FIG. 6 is a bottom perspective view of the frame cover depicted in FIG. 3;

FIG. 7 is a front view of a lens depicted in FIG. 1;

FIG. 8 respectively show an exploded perspective view of a mirror and mirror support as shown in FIG. 1;

FIG. 9 is a back view of the mirror support depicted in FIG. 8;

FIG. 10 is a cross sectional view of the mirror support taken along lines C—C of FIG. 9;

FIG. 11 is a cross sectional view of a mirror support taken along lines A—A of FIG. 9;

FIG. 12 is a cross sectional view of a mirror support taken along lines B—B of FIG. 9;

FIG. 13 is a perspective view of a nose bridge mounted in a nose bridge support;

FIG. 14 is a side view of the nose bridge and nose bridge support depicted in FIG. 13;

FIG. 15 is a front view of the nose bridge depicted in FIG. 13;

DESCRIPTION OF THE PREFERRED EMBODIMENT

Figure 1:
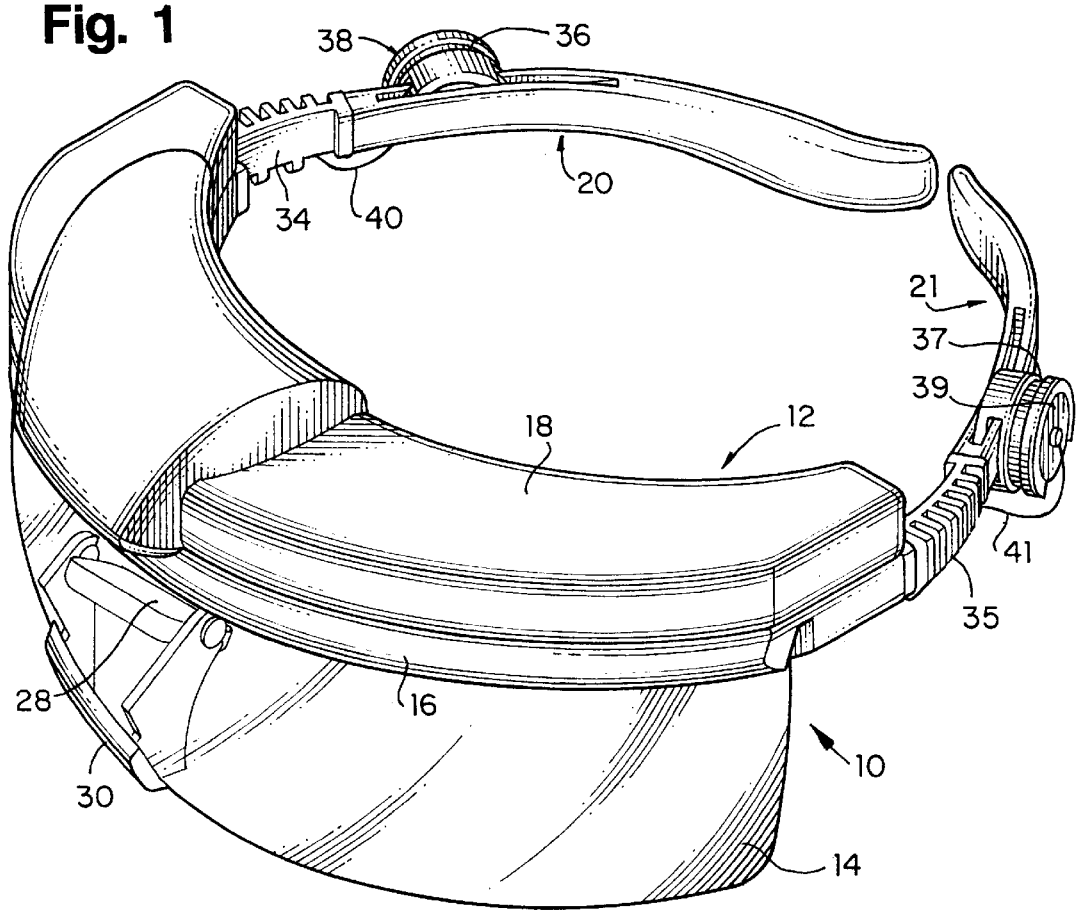
FIG. 1 is a front perspective view of the head mounted display system of the present invention taken from the side.
Figure 2:
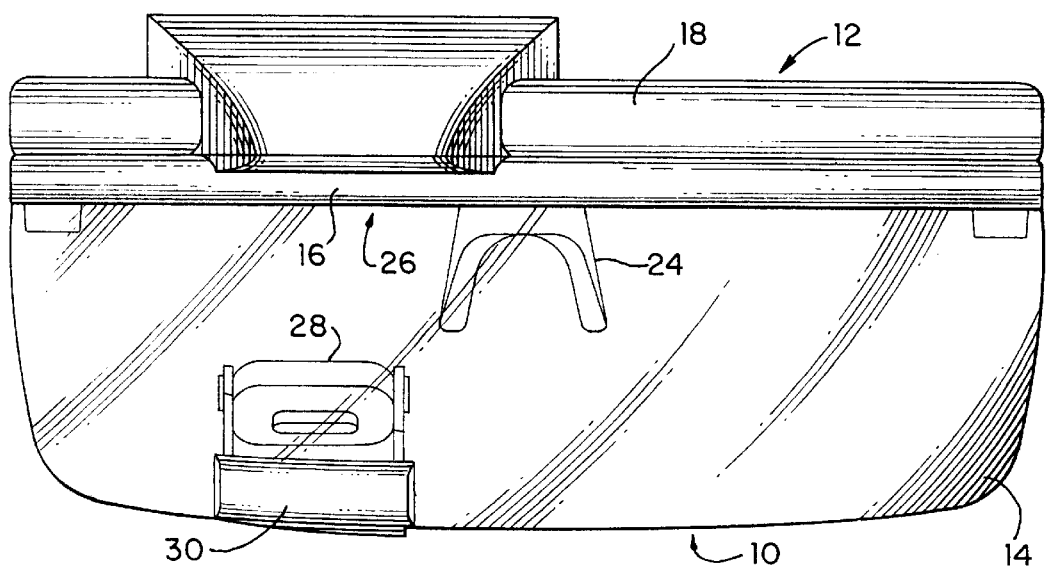
FIG. 2 is a front perspective view of the head mounted display system depicted in FIG. 1.

The head mounted display system 10 of the present invention as shown in FIG. 1 includes a frame generally designated 12. The frame 12 includes a lens or transparency 14, a lens holder 16, a top cover 18, right and left temples 20 and 21 and a nose piece 24. The frame 12 supports a display 26 such as a miniature LCD video display. The display 26 is mounted over an aperture 84 in the lens holder 16 so that the information depicted on the display 26 can be reflected by a mirror 28. The mirror 28 is shaped to collimate light so as to project an enlarged image of the displayed information at a distance from the user. The mirror 28 is preferably a toroidal reflector or the like that is fully reflective or partially reflective. The mirror 28 and display 26 may be as shown and described in detail in U.S. Pat. No. 5,162,828 incorporated herein by reference.

The head mounted display system 10 is modular in nature such that various components of the system 10 can be removed and replaced and/or adjusted so as to accommodate various users as well as various applications of the head mounted display system. For example, the mirror 28 is pivotally mounted in a 1mirror support 30 so as to allow the optical path defined by the display 26, the mirror 28, and an eye of the user to be adjusted relative to a first axis which is the axis of rotation or axis about which the mirror 28 pivots. Further, the nose piece 24 is movably mounted relative to the lens holder 16 so as to allow the distance between a bottom surface 32 of the lens holder 16 and the user's nose to be varied to adjust the optical path defined by the relative positions of the display 26, mirror 28, and the user's eye relative to a second, generally vertical axis. The nose piece 24 is further completely removable from the frame 12 so that the head mounted display system 10 may be worn by a user wearing conventional glasses. More particularly, when worn by a person wearing glasses, the lens holder 16 rests on the frame of the glasses so that the nose piece of the glasses is in the same general position as the nose piece 24 would have been in if it had not been removed. Therefore, it is the nose piece of the conventional glasses that supports the frame 12 on the user when the nose piece 24 is removed.

The mirror 28 is removably mounted in the mirror support 30 so that mirrors having various optical qualities for use in various applications may be mounted in the mirror support 30. Further, the mirror support 30 itself may be removed from the lens 14 so as to allow the whole mirror structure to be replaced. Further, because the mirror support is removably mounted on the lens 14, the lens 14 may be replaced without the need to replace the mirror support 30 and mirror 28. More particularly, the lens 14 is removably mounted in a recess of the lens holder 16 so as to allow the lens 14 to be removed therefrom. This feature allows lenses or transparencies having various light transmissive or optical qualities to be mounted in the lens holder 16 and to be used with a single mirror 28 and mirror support 30. For example, for indoor use, it is generally desirable to have a lens that is clear whereas for use outdoors, a tinted lens might be preferable. Because the lens 14 and mirror support 30 are removable, the different lenses may be used with the same lens holder 16, mirror support 30, and mirror 28 so as to make the head mounted display system 10 flexible and accommodate various applications.

Each of the temples 20 and 21 includes a respective hinge 34, 35 that exerts a force on the temples 20, 21 to direct the temples inward so that they hug the user's head. The hinges are removable so that hinges of various flexibility can be employed with the system 10 to allow the system to be worn more comfortably by users having large differences in head sizes. Further, the system 10 may include one or more earphones 38, 39. Each of the earphones 38, 39 is connected to a circuit contained within the cavity formed by the lens holder 16 and top cover 18 via wires 40, 41 and electrical connectors that fit into respective electrical jacks disposed on a bottom surface of the lens holder 16, as discussed below. The wires 40, 41 are retained adjacent to the temples 20, 21 by hooks formed integrally with the hinges 34, 35. The wires 40, 41 are removable from the hooks of the hinges 34, 35 and the earphone connectors are removable from the jacks in the lens holder 16 so as to enable the earphones 38, 39 to be removed from the display system 10 and replaced. Further, the earphone retainers 36, 37 are removably mounted on the respective temples 20, 21 so that they may also be removed from the system 10. The removable earphone retainers and earphones allows a user to utilize different earphones that are connectable with the earphone jacks of the system 10.

The top cover 18 and lens holder 16 are shown in detail in FIGS. 3–6. The top cover 18 has a top profile with a crescent-like shape and a generally flat top surface 40. A slight housing extension 46 is formed in the top surface 44 to accommodate the display 26. An inner surface 48 of the top cover is formed with a rectangular recess 50 therein so as to receive an upwardly extending member 231 of the nose piece 24, as described in detail below, such that an outer surface of the nose piece member 231 received in the recess 50 is flush with the inner surface 48 of the top cover. A generally arcuate opening 52 is formed in an end 54 of the top cover 18 to accommodate an electrical connector that mates to an electrical connector carried on an end of a single wire that couples video, audio, and power from a portable interface unit to the display 26 and circuitry contained in the housing formed by the top cover 18 and lens holder 16. The circuitry contained in the housing formed by the top cover 18 and lens holder 16 as well as the portable interface unit are disclosed in detail in U.S. patent application Ser. No. 07/973,155, filed Nov. 6, 1992, entitled PORTABLE VIDEO DISPLAY SYSTEM, and assigned to the Assignee of the present invention, and in U.S. patent application Ser. No. 07/986,422, filed concurrently herewith, entitled HEAD MOUNTED VIDEO DISPLAY SYSTEM WITH PORTABLE VIDEO INTERFACE UNIT, and also assigned to the Assignee of the present invention.

A recess 56 is also formed in an outer sidewall 58 of the top cover 18 so as to accommodate a brightness control knob or other control input for the display system. However, if desired, the brightness control input may be disposed on the portable interface unit. The top cover 18 includes four symmetrically disposed hooks, only three of which, 60, 61, and 62, are shown to secure the top cover 18 to the lens holder 16. The hooks 60 and 61 extend downwardly from an inner sidewall 64 of the top cover 18 such that an outer surface 66 of the hooks 60, 61 is flush with the surface 48 of the top cover. Each of the hooks 60, 61, and 62 is formed with a protrusion 68 that extends in towards the cavity 70 of the top cover 18. The two hooks 62 symmetrically disposed on an outer sidewall 72 of the top cover are such that the lower edge of the hooks 74 is flush with a lower edge 76 of the sidewall 72.

The lens holder 16 has a generally crescent-shape so that the outer walls of the lens holder 16 conform to the outer walls of the top cover 18. The lens holder 16 supports on a top surface 80 thereof the display 26 and lower and upper printed circuit boards, not shown. More particularly, the top surface 80 is formed with a slight recess 82 therein that is generally square or rectangular in shape to mount the display 26. The recess is formed with a centrally located, generally rectangular aperture 84 over which is placed the face of the display 26 so that the displayed information can be received by the mirror 28. A number of short ribs such as 86, 87, and 88 extend upwardly from the top surface 80 of the lens holder 16 so as to support a lower printed circuit board thereon. The lower printed circuit board includes at least one hole through which a boss 90 extends when the lower printed circuit board is mounted on the lens holder 16. The boss 90, a second boss 91, and a pair of large ribs 92 and 94 are symmetrically disposed about the top surface 80 of the lens holder 16 so as to support the upper printed circuit board. The upper printed circuit board includes a pair of holes that are smaller in diameter than the diameter of the respective bosses 90, 91, but which are large enough to receive therein pins 95 and 96 extending upwardly from respective bosses 90, 91. When the upper printed circuit board is mounted on the lens holder 16, the board rests on the ribs 92, 94, as well as on the upper surfaces of the respective bosses 90, 91 with the pins 95, 96 extending through the holes in the upper printed circuit board.

The lens holder 16 includes an indentation 100 that is formed in an innerwall 102 thereof, such that the indentation 100 is aligned with the recess 50 of the top cover 18 when the top cover 18 is mounted on the lens holder 16. When the top cover 18 is mounted on the lens holder 16, the indentation 100 forms an aperture through which a flange 246 on the nose piece 24 extends so as to mount the nose piece 24 on the frame 12. A pair of upwardly extending ribs 104 and 106, having an arcuate upper surface, are disposed in an end 108 of the lens holder 16 so as to be aligned with the arcuate opening 52 formed in the top cover 18 when the top cover 18 is mounted on the lens holder 16. The ribs 104 and 106 support the electrical connector that mates with the connector coupled to the end of the single wire providing the video, audio, and power from the portable interface unit to the display 26 and lower and upper printed circuit boards.

As shown in detail in FIGS. 4 and 5, the lens holder 16 has a generally flat bottom surface 110 with a longitudinally extending recess 112 formed therein. The recess 112 extends substantially the length of the front of the lens holder 16 so as to be able to receive therein the upper edge of the frame of a pair of conventional glasses when the nose piece 24 is removed from the display system 10. More particularly, when the display system 10 is worn by a user also wearing a pair of glasses, the surface 116 of the recess 112 rests on the upper edge of the frame of the glasses so that the display system 10 is supported by the glasses frame, and in particular, by the nose piece of the glasses. The recess 112 is positioned in the bottom surface 110 of the lens holder 16 so that when supported on a pair of glasses, the nose piece of the glasses is in substantially the same position that the nose piece 24 would be if not removed from the frame 12. It is noted that although the recess 112 is shown extending to the outer sidewall 114 of the lens holder 16, it need not extend so far, but only enough to receive the upper edge of a frame of a pair of glasses wherein at least a portion of the recess 112 is between an innerwall 118 and/or the inner sidewall 102 of the lens holder 16 and the aperture 84 for the display 26.

A hollow box-shaped member 120 is formed in a central location on the bottom surface 110 of the lens holder 16, and in particular, in the recess 112 adjacent to the outer sidewall 114 of the holder 16 so as to receive a member 244 of the nose piece 24, as described in detail below. More particularly, the box member 120 includes an aperture 122 formed between a pair of sidewalls 124 and 125 where the aperture 122 is aligned with the indentation 100. When the nose piece 24 is mounted on the frame 12, one flange 244 of the nose piece 24 extends through the aperture 122 into the box member 120, whereas a second flange 246 extends through the aperture formed by the indentation 100 into the cavity or housing formed by the top cover 18 and lens holder 16, so as to removably mount the nose piece 24 on the frame 12.

A pair of earphone jack mounting members 130 and 131 are integrally formed on the bottom surface 110 of the lens cover 116 adjacent respective ends 108 and 132 of the lens holder 16. The earphone jack mounting members 130, 132 extend downwardly from the bottom surface 110 of the lens holder 16, and each member 130, 131 includes a respective aperture 134, 136 so as to allow an earphone connector to be inserted therethrough for connection with the jack mounted in the members 130, 131. The ends 108 and 132 of the lens holder 16 are also formed with respective T-shaped apertures therein, 138 and 140, so as to receive and movably mount the respective T-shaped ends of the respective hinges 34 and 35, as discussed in detail below.

The outer sidewall 114 of the lens holder 16 is formed with a longitudinally extending recess 142 that extends substantially the length of the outer sidewall 114 between an inner surface 144 of the outer wall 114 and an innerwall 146, wherein the recess 142 receives the lens or transparency 14 of the frame 12. Five ribs are symmetrically disposed in the recess 142 formed between the outer wall 114 and innerwall 146 so as to engage hooks formed on the lens 14 in order to maintain the lens 14 in place on the frame 12.

More particularly, the lens 14 as shown in FIG. 7 includes, adjacent an upper edge 160 thereof, five L-shaped indentations 161–165 so as to form five hook members 166–170 in the lens 14. The hook members 166–170 are symmetrically disposed along the upper edge 160 of the lens 14 and are spaced in accordance with the spacing of the ribs 150, 151, 152, 156, and 158, so as to engage an upper surface of the ribs to mount the lens 14 on the lens holder 16. The hook members 166–170 of the lens 14 all extend in the same direction so that the lens may be mounted on the lens holder 16 by sliding the lens 14 in the recess 142 to the left, or by reversing the lens 14 and sliding the lens in the recess 142 to the right. It is noted, because the hooks 166–170 of the lens 14 and the ribs 150, 151, 152, 156, and 158 of the lens holder 16 are symmetrical, the lens 14 may be mounted with a mirror mounting surface generally designated 180 on the right side or the left side of the display system. The lens mounting surface 180 includes a pair of upwardly extending slots 182 and 184 that receive therein respective sidewalls of the mirror support 30. Further, the mirror mounting surface 180 of the lens 14 includes a slot 186 that extends horizontally between the upwardly extending slots 182 and 184. The horizontally extending slot 186 receives a protrusion formed on the mirror support 30, as described in detail below, so as to maintain the mirror support 30 securely on the lens 14.

It is noted that the lens 14 may be formed of a lightweight plastic, or the like, that is flexible or bendable so that the lens, when mounted in the recess 142, conforms to the arcuate shape of the recess, as shown in FIG. 1. Further, the lens 14 may be formed with different diopters so as to accommodate people that are slightly near-sighted or far-sighted for example. Although the lens 14 is shown in FIG. 7 as a single lens, the lens 14 may be split into two lenses, one covering the right side of the display system, and the other covering the left side of the display system, if desired. The lens 14 may also be tinted for outdoor use, for example, or the lens 14 may be clear for indoor use. Because the lens is removably mounted on the lens holder 16, the lens 14 can easily be changed to suite a particular application of the display system 10.

The mirror support 30, as shown in FIGS. 8B–10 includes a frontwall 190 that extends across the support 30 between a pair of sidewalls 192, 194. A backwall 196 also extends between the sidewalls 192, 194. The backwall 196 is spaced from the frontwall to form a recess 198 therebetween so that the mirror support mounting portion 180 of the lens 14 can be received in the recess 198. As shown in FIG. 10, the frontwall 190 includes a longitudinally extending protrusion or hook that extends from the back surface of the frontwall towards the backwall 196. When the mirror support 30 is mounted on the lens 14, sidewalls 192 and 194 are respectively received in the slots 182 and 184 of the lens 14, and the protrusion 200 is received in the slot 186 of the lens so as to removably mount the mirror support 30 on the lens 14.

The mirror support 30 also includes a pair of arms 202 and 204 that extend from opposite sides of the backwall 196 in a direction away from the frontwall 190. Each of the arms 202, 204 includes an aperture 206, 208 for receiving respective knobs 208, 210 therein, so as to removably mount the mirror 28 in the mirror support 30. It is noted that this mounting of the mirror 28 in the mirror support 30 allows the mirror to be rotated about an axis that extends generally through the center of the knobs 208 and 210, so that a user can adjust the optical path defined by the display 26, the mirror 28, and the user's eye. Because the lens 14 on which the mirror support 30 is removably mounted is curved, the mirror support 30 is shaped with a varying cross section such that the arm 202 extends inwardly towards the user's face from the backwall 196, a greater distance than the arm 204. Therefore, when the mirror 28 is mounted in the apertures 206 and 208 of the respective arms 202 and 204, the mirror is in a position such as shown by the dotted line 206 of FIG. 10, wherein the axis of the mirror 28 extending between the centers of the knobs 208 and 210 is not parallel to the backwall 196 of the support 30, but is at an angle thereto. However, this mounting does allow the axis 212 of the mirror 28 to be generally parallel to the user's face for easy viewing. Because the mirror 28, and in particular the knobs 208, 210, can be removed from the apertures 206 and 208 of the arms 202 and 204 of the mirror support 30, mirrors 28 having different focal lengths can be utilized to change the distance at which the image is projected as viewed by the user, so that depending upon the environment that the user is in, the user can select a mirror 28 with the desired focal length. Further, because the mirror support 30 can be removed from the lens 14, the lens 14 may be changed so as to accommodate the various environments in which the display system 10 is used without the need for replacing the mirror 28 and mirror support 30 also.

As shown in FIGS. 13–15, the nose piece 24 includes a nose bridge 220 that is made of a relatively soft, flexible material for supporting the display system 10 on the user's nose when the user is not wearing a conventional pair of glasses. The nose piece 24 also includes a flange 224 that extends upwardly from a base 226 of the nose bridge 220 where the flange 224 is preferably formed of a relatively rigid plastic. The flange 224 on a front surface thereof includes a number of protrusions 227–229 to allow the nose piece 24 to be adjustably mounted in a nose piece holder 230. More particularly, the nose piece holder 230 includes an upwardly extending, generally rectangularly-shaped and hollow member 231 for receiving the flange 224. The nose bridge holder member 231 includes apertures 232, 233, and 234 that are vertically aligned so as to receive respective vertically aligned protrusions 227, 228, and 229 on the flange 224 when the nose piece 24 is in a fully retracted position. In order to increase the distance between the nose bridge 220 and the lens holder 16, the flange 224 is moved downward in the member 231 of the nose bridge holder so that the protrusions 227 and 228 extend through the apertures 233 and 234. To further increase the distance between the nose bridge 220 and the lens holder 16, the flange 224 is moved downwardly so that the protrusion 227 is received in the aperture 234. In this position, the nose bridge 220 is at its greatest distance from the lens holder 16. This adjustable mounting for the nose bridge 220 allows the distance between the lens holder 16 that supports the display 26 and the user's nose to be varied to adjust the optical path defined by the relative position of the display 26, the mirror 28, and the user's eye to be adjusted relative to a generally vertical axis defined by the apertures 232–234. This feature thus allows the display system 10 to more easily accommodate users having different head sizes and head configurations so that the display system 10 may be easily worn and the image of the displayed information be easily viewed via the mirror 28. It is noted that the nose bridge 220 may, or may not, be completely removable from the nose bridge holder 230.

As shown in FIGS. 13 and 14, the nose bridge holder 230 includes a base member 240 that extends at generally right angles from the upwardly extending member 231, the base member 240 having an aperture 242 therein so as to allow the flange 224 of the nose bridge to be received therein and extend upwardly into the member 231. The base 240 further includes a flange 244 extending outwardly therefrom. The upstanding member 231 of the nose bridge holder 230 also includes a flange 246 that extends at generally right angles from the upstanding member 231 and generally parallel to the flange 244 of the base 240. In order to mount the nose bridge holder 230 and in turn the nose bridge 220 on the frame 12, the flange 244 on the base 240 of the nose bridge holder 230 is inserted into the aperture 122 formed on the bottom surface 116 of the lens holder. At the same time, the flange 246 extending from the upstanding member 231 of the nose bridge holder 230 is inserted into the aperture formed by the indentation 100 of the lens holder and the rectangular recess 50 of the top cover 18 so that the flange 246 extends into the housing formed by the lens holder 16 and the top cover 18. In order to securely maintain the nose piece 24 in place, the base member 240 is formed with a lip or hook portion 250 to engage a wall defining the aperture 122 of the box 120. Thus, the nose piece 24 may be removably mounted on the frame 12 of the display system 10. The nose piece 24 is easily removed to allow the display system 16 to be worn with a pair of conventional glasses, as described in detail above.

Figure 16:
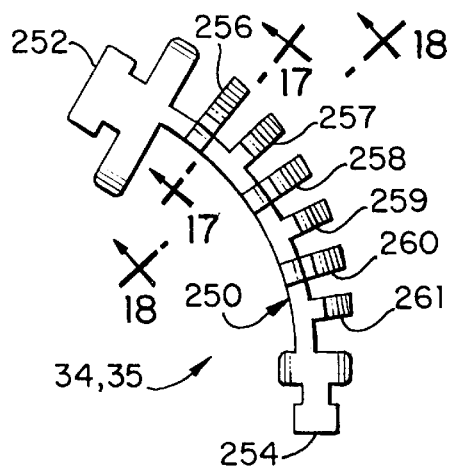
FIG. 16 is a bottom view of a hinge depicted in FIG. 1.
Figure 17:
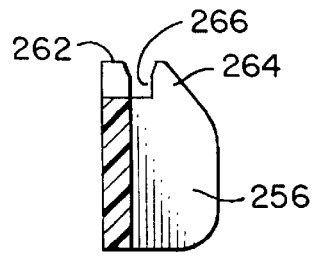
FIG. 17 is a cross sectional view of the hinge taken along lines A—A of FIG. 16.
Figure 18:
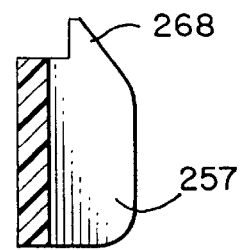
FIG. 18 is a cross sectional view of the hinge taken along lines B—B of FIG. 16.

An example of a hinge suitable for the hinges 34, 35 of the temples 20, 21, is depicted in FIG. 16. The hinge 34, 35 has an elongated body that is curved inwardly towards the user's head when the hinge is mounted on the lens holder 16. The body 250 includes a generally T-shaped mounting member 252 that is receivable in a T-shaped aperture 138, 140 so as to removably mount the hinge on the lens holder 16. The body 250 of the hinge 34, 35 at an opposite end of the member 252 has an additional generally T-shaped mounting member 254 that is received in an aperture 272 of the temple 20, 21 so as to secure the hinge 34, 35 to the remainder of the temple bar. The hinge body 250 also includes a number of outwardly extending ribs 256–261. Alternate ribs 256, 258 and 260 include a pair of generally parallel extending rib fingers 262 and 264, extending from the respective rib body so as to form an aperture 266 between the fingers 262 and 264 in order to maintain the wire 40, 41 of the earphone 38, 39 therein. Alternate ribs 257, 259, and 261 have only a single rib finger 268 extending therefrom so as to guide the wire 40, 41, but not retain it. The rib fingers 262 and 264 of each of the ribs 256, 258, and 260 are flexible so that the wire 40, 41 of the earphone may be easily inserted therein and removed therefrom.

Figure 19:
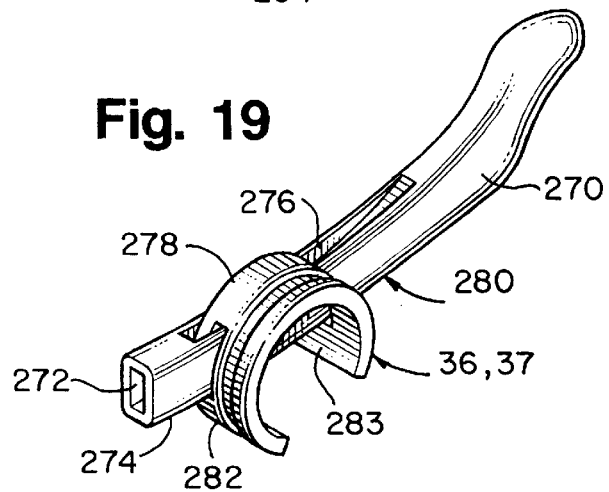
FIG. 19 is a perspective top view of the temple and earpiece retainer depicted in FIG. 1.
Figure 20:
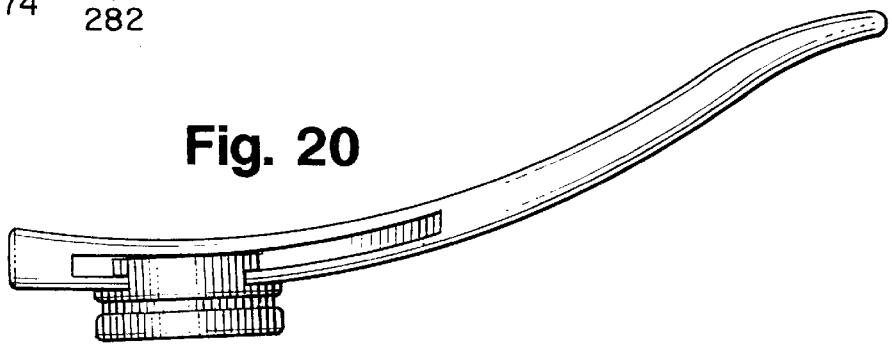
FIG. 20 is a top view of the temple and earpiece retainer depicted in FIG. 19.
Figure 21:
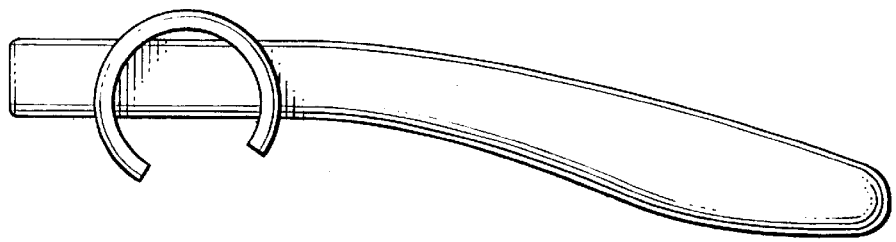
FIG. 21 is a side view of the temple and earpiece retainer depicted in FIG. 19.

The temple bar 270 of the temples 20, 21 is shown in FIGS. 19–21. the temple bar 270 includes an aperture 272 formed in an end 274 thereof so as to receive the generally T-shaped end 254 of the hinge 34, 35 to mount the temple 270 on the hinge 34, 35. The temple bar 270 includes a longitudinally extending groove 276 that is formed in an upper surface of the temple bar so as to guide a mounting member 278 of a ring earphone retainer 36, 37. Preferably, the temple bar 270 also includes a second groove, not shown, that extends longitudinally along a bottom surface 280 of the temple so as to receive portions 282 and 283 of the ring retainer 36, 37 therein. The grooves 276 guide the ring retainer 36, 37 along the length of the temple bar 270 so that the position of the ring retainer 36, 37 along the temple bar 270 may be adjusted. Further, the mounting members 278, 282, and 283 of the ring earphone retainers 36, 37 allow the retainer to be removably mounted on the temple bar 270. If a user of the display system 10 desires to use speakers or earphones different than the earphones 38, 39, the earphones 38, 39 can be removed, as described above. Similarly, the earphone ring retainers 36, 37 may be snapped off the temple bar 270 to remove them from the display system 10. Other earphones or booms that may be used with the display system 10 preferably have a mounting member that is receivable in the grooves 276 of the temple bar 270 to allow the earphone, speaker or boom to be mounted on the frame 12 of the system 10.

Because of the modular configuration of the head mounted display system 10 of the present invention, the system 10 can accommodate different users so that it is suitable for a wide cross-section of the consumer population. Further, because the display system 10 can accommodate components of various configurations, the system of the present invention may be updated to fit the desires or particular applications of a given user.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A head mounted display system comprising:
   a display for displaying information;
   a reflector that receives displayed information to allow a user to view the displayed information by viewing the reflector;
   a frame for supporting the display and the reflector on a user's head; and
   a optical path adjusting system for allowing an optical path defined by the relative position of the reflector, the display and an eye of the user to be adjusted relative to at least two axes of the head mounted display system.

2. A head mounted display system as recited in claim 1 wherein said optical path adjusting system includes an adjustable mounting for said reflector.

3. A head mounted display system as recited in claim 1 wherein said optical path adjusting system includes a mounting for said reflector to allow said reflector to rotate about a first axis.

4. A head mounted display system as recited in claim 1 wherein said optical path adjusting system includes means for varying the distance between the display and the user's eye.

5. A head mounted display system as recited in claim 1 wherein said optical path adjusting system includes means for varying the distance between the reflector and the user's eye.

6. A head mounted display system as recited in claim 1 wherein said optical path adjusting system includes a nosepiece that is adjustably mounted relative to said frame to allow said frame to be raised and lowered relative to a user's nose.

7. A head mounted display system comprising:
   a display for displaying information;
   a reflector that receives displayed information to allow a user to view the displayed information by viewing the reflector; and
   a frame for supporting the display and the reflector, said frame having a frame member on which said display is mounted and a nose piece movably mounted relative to said frame member to allow the distance between the frame member and the user's nose to be varied to adjust an optical path defined by the relative position of the display, reflector and the user's eye.

8. A head mounted display system as recited in claim 7 wherein said frame member includes a vertically extending receptacle.

9. A head mounted display system as recited in claim 8 wherein said locking means includes a plurality of vertically aligned apertures in said recess and said flange includes at least one protrusion extending therefrom and receivable in a plurality of said apertures.

10. A head mounted display system as recited in claim 8 wherein said nose piece is removable to allow said display system to be worn over a pair of glasses such that said frame member rests on the glasses.

11. A head mounted display system as recited in claim 7 wherein said reflector is movable to vary an optical path defined by the relative position of the display, the reflector and the user's eye.

12. A head mounted display system as recited in claim 7 wherein said nose piece is removable to allow said display system to be worn over a pair of glasses such that said frame member rests on the glasses.

13. A head mounted display system as recited in claim 12 wherein said reflector is movable to vary an optical path defined by the relative position of the display, the reflector and the user's eye.

14. A head mounted display system as recited in claim 7 wherein said frame includes at least one transparency and said reflector is mounted on said transparency.

15. A head mounted display system as recited in claim 14 wherein said reflector is pivotably mounted on said transparency to allow said reflector to be pivoted about an axis.

16. A head mounted display system as recited in claim 7 wherein said nose piece includes a nose bridge holder mounted on said frame member and a nose piece bridge movably mounted on said nose piece holder to allow the distance between the frame member and the user's nose to be varied.

17. A head mounted display system as recited in claim 16 wherein said nose bridge holder includes a generally vertically extending member and a plurality of vertically aligned mounting members disposed on said vertical member and said nose bridge includes a flange extending upwardly from a downwardly curved nose rest member, said flange including at least one engaging member for engaging a different one of said vertically aligned mounting members in each of a plurality of different nose piece mounting positions.

18. A head mounted display system as recited in claim 16 wherein said nose bridge holder includes a vertically extending receptacle, said nose piece includes a curved member for resting on a user's nose and flange extending upwardly from said curved member and receivable in said receptacle; and means for locking said flange into one of a plurality of positions in said recess wherein the flange extends into said recess by different amounts for each of said positions.

19. A head mounted display system recited in claim 18 wherein said locking means includes a plurality of vertically aligned apertures in said recess and said flange includes at least one protrusion extending therefrom and receivable in a plurality of said apertures.

20. A head mounted display system as recited in claim 16 wherein said nose bridge holder is removably mounted on said frame member.

21. A head mounted display system comprising:
   a display for displaying information;
   a reflector that receives displayed information to allow a user to view the displayed information by viewing the reflector; and
   a frame for supporting the display and the reflector on a user's head, said frame having a frame member on which said display is mounted and said frame member having a longitudinally extending recess disposed between an inner edge and an outer edge of said frame member for receiving an upper edge of a frame of a pair of glasses and a nose piece for supporting the frame on a user's face, said nose piece being removable to allow said frame member to rest on a pair of glasses with an upper edge of a frame of the glasses extending into said recess.

22. A head mounted display system as recited in claim 21 including at least one transparency mounted in said frame member, said reflector being mounted on said transparency.

23. A head mounted display system as recited in claim 21 wherein said reflector is pivotably mounted on said frame member to allow said reflector to pivot about an axis.

24. A head mounted display system as recited in claim 21 wherein said recess is disposed between said inner edge of said frame member and said display.

25. A head mounted display system comprising:
   a display for displaying information;
   a frame for supporting said display on a user's head, said display being fixedly mounted on said frame;
   means for collimating light to project an enlarged image of said displayed information at a distance from the user, said collimating means being removably mounted on said frame independently of said display to allow replacement of said collimating means without removal of said display.

26. A head mounted display system as recited in claim 25 wherein said frame includes a transparency and said collimating means is removably mounted on the transparency.

27. A head mounted display system as recited in claim 25 wherein said collimating means includes a reflector and further including a support mounted on said frame, said reflector being mounted in said support for pivotal movement about an axis and said reflector being removable from said support.

28. A head mounted display system as recited in claim 25 wherein said collimating means includes a reflector and further including a support removably mounted on said frame, said reflector being mounted in said support for pivotal movement about an axis.

29. A head mounted display system comprising:
   a display for displaying information;
   a frame for supporting said display on a user's head, said display being fixedly mounted on said frame; and a reflector for projecting an enlarged image of said displayed information at a distance from the user, the image being viewed through the reflector and the reflector being removably mounted on said frame independently of said display to allow replacement of said reflector without removal of said display.

30. A head mounted display system as recited in claim 29 wherein said frame includes a transparency and said reflector is removably mounted on the transparency.

31. A head mounted display system as recited in claim 30 wherein said transparency incudes an aperture disposed therein and further including a support member on which said reflector is mounted, said support member having a base with a protrusion extending therefrom said protrusion snapping into said aperture to mount said support member on said transparency.

32. A head mounted display system as recited in claim 31 wherein said reflector is pivotably mounted in said support member.

33. A head mounted display system as recited in claim 30 wherein said temple includes at least one longitudinally extending guide member and said earphone retaining member is slidable along said guide member.

34. A head mounted display system as recited in claim 29 further including a support mounted on said frame said reflector being mounted in said support for pivotal movement about an axis and said reflector being removable from said support.

35. A head mounted display system as recited in claim 29 further including a support removably mounted on said frame, said reflector being mounted in said support for pivotal movement about an axis.

36. A head mounted display system comprising:
   a display for displaying information;
   optics for collimating light to project an enlarged image of said displayed information at a distance from the user to allow said displayed information to be viewed by a user;
   a frame for supporting the display and the optics on a user's head said frame including a pair of temples;
   at least one earphone to project audio information; and
   at least one earphone retaining member mounted on one of said temples to retain the earphone when the earphone is not in use, said earphone being removable from said retaining member when said earphone is in use.

37. A head mounted display system as recited in claim 36 wherein said earphone retaining member is removably mounted on said temple and said earphone is coupled to an electrical connector for connection with a mating connector disposed on said frame to allow said earphone to be removable.

38. A head mounted display system as recited in claim 37 wherein said earphone is coupled to said connector via a wire and said temple includes a hinge and said hinge includes means for retaining said wire adjacent said temple.

39. A head mounted display system as recited in claim 38 wherein said hinge includes an elongated member curved inwardly and slightly flexible so as to maintain the temple on users' heads of various sizes.

40. A head mounted display system as recited in claim 38 wherein said wire retaining means includes a plurality of wire retaining members to allow said wire to be removably retained therein.

41. A head mounted display system as recited in claim 36 wherein said optics include a reflector that is viewed by the user to view said image.

42. A head mounted display system comprising:
   a display for displaying information;
   optics for collimating light to project an enlarged image of said displayed information at a distance from the user to allow said displayed information to be viewed by the user;
   a frame for supporting said display and said optics on a user's head, said frame including:
      a frame member on which said display is mounted, said frame member having an outer edge, a longitudinally extending recess adjacent said outer edge and a plurality of transparency retaining members disposed in said recess along the length thereof;
      at least one transparency on which said optics is removably mounted, said transparency having an upper edge with a plurality of hook portions formed therein, the hook portions having openings facing one direction, said upper edge being received in said recess and said hook portions engaging respective transparency retaining members in said recess to removably mount said transparency in said frame member.

43. A head mounted display system as recited in claim 42 wherein said transparency is reversible.

44. A head mounted display system as recited in claim 42 wherein said optics include a reflector that is viewed by the user to view said image, said reflector being mounted on said transparency.

45. A head mounted display system as recited in claim 44 wherein said reflector is mounted on a reflector support, said reflector support is mounted on said transparency and said transparency includes at least one retaining aperture formed therein for engaging said reflector support so as to retain said reflector on said frame.

46. A head mounted display system as recited in claim 45 wherein said transparency includes a first locating aperture and second locating aperture formed therein for engaging said reflector support so as to maintain the position of said reflector support relative to said display.

47. A head mounted display system comprising:
   a display for displaying information;
   a transparency;
   a frame for supporting said display and transparency on a user's head said display being fixedly mounted on said frame and said transparency being removably mounted on said frame; and
   optics for collimating light to project an enlarged image of said displayed information at a distance from said user, at least a portion of said optics being removably mounted on said transparency.

48. A head mounted display system as recited in claim 47 wherein said optics include a reflector and said reflector is removably mounted on said transparency.

49. A head mounted display system as recited in claim 47 wherein said transparency is removably mounted in said frame.

50. A head mounted display system comprising:
   a display for displaying information;
   a transparency;
   a frame for supporting said display on a user's head, said display being fixedly mounted on said frame and said transparency being removably mounted on said frame;
   optics for collimating light to project an enlarged image of said displayed information at a distance from said user, at least a portion of said optics being removably mounted on said transparencies; and
   a nose piece removably mounted on said frame.

* * * * *